Figure 1:
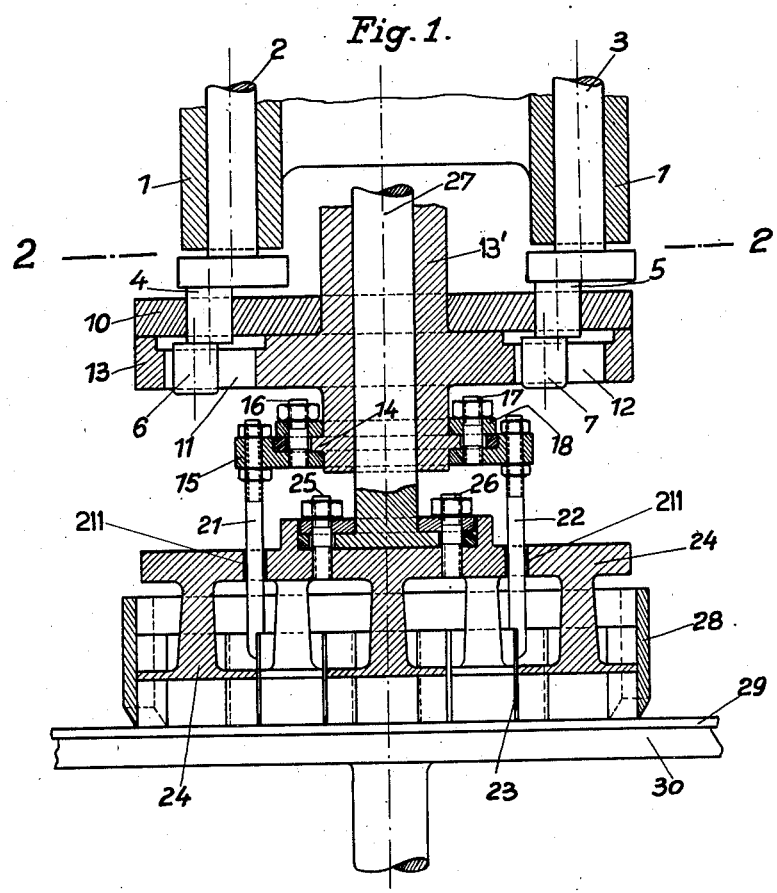

June 3, 1930.  O. KREMMLING  1,761,399

METHOD OF AND MACHINE FOR WORKING PIECES OF DOUGH

Filed June 1, 1927  8 Sheets-Sheet 1

Inventor:
Otto Kremmling
by
Lotka, Kehlenbeck & Farley
Attorneys

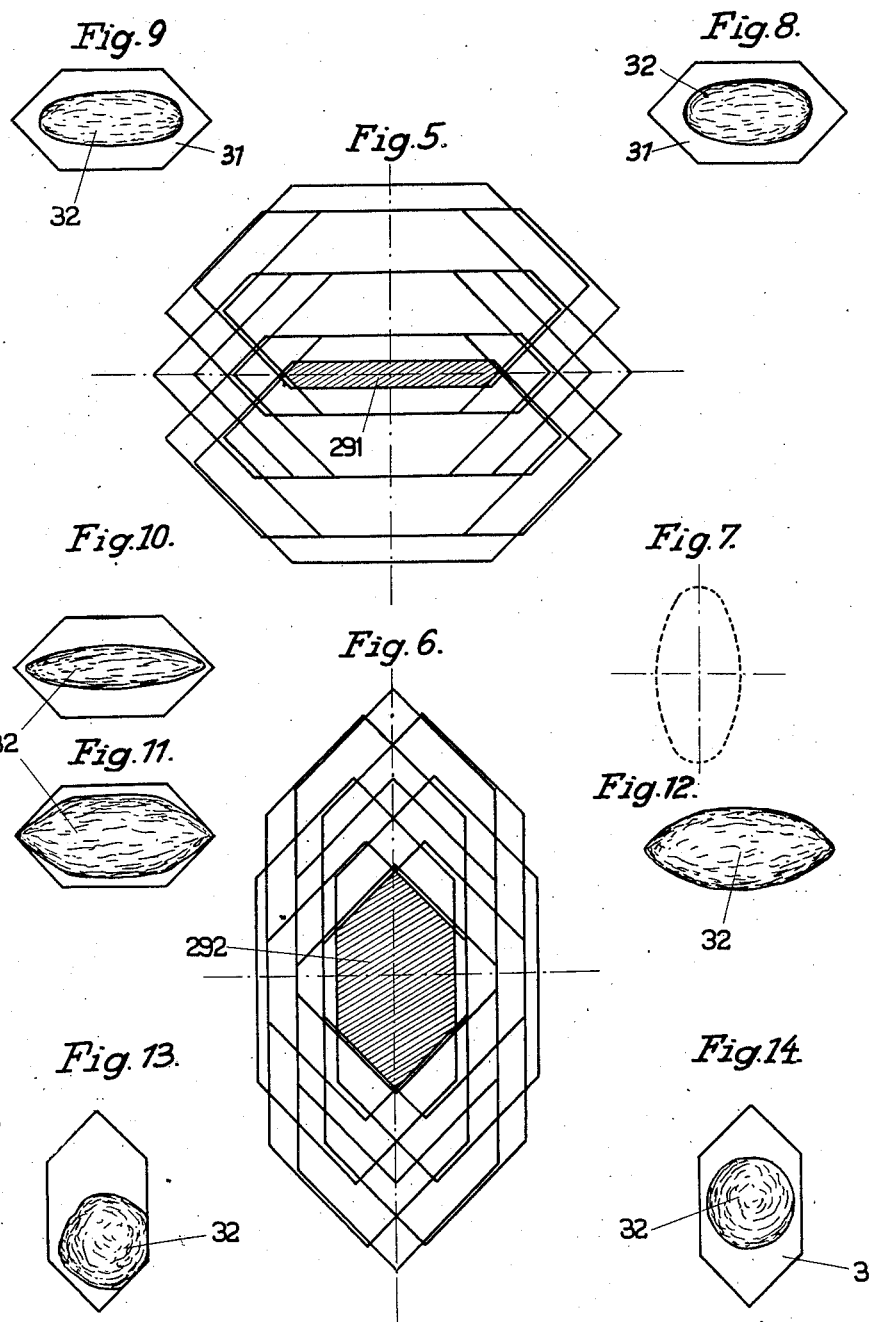

Inventor:
Otto Kremmling
by Locka, Kehlenbeck & Farley
Attorneys

June 3, 1930. O. KREMMLING 1,761,399
METHOD OF AND MACHINE FOR WORKING PIECES OF DOUGH
Filed June 1, 1927 8 Sheets-Sheet 6

Inventor:
Otto Kremmling
by
Locka, Kehlenbeck & Farley
Attorneys

Inventor:
Otto Kremmling
by Lotka, Kehlenbeck & Farley
Attorneys

June 3, 1930. O. KREMMLING 1,761,399
METHOD OF AND MACHINE FOR WORKING PIECES OF DOUGH
Filed June 1, 1927 8 Sheets-Sheet 8

Inventor:
Otto Kremmling
by
Lotka, Kehlenbeck & Farley
Attorneys

Patented June 3, 1930

1,761,399

UNITED STATES PATENT OFFICE

OTTO KREMMLING, OF HAMERSLEBEN, NEAR OSCHERSLEBEN, GERMANY

METHOD OF AND MACHINE FOR WORKING PIECES OF DOUGH

Application filed June 1, 1927, Serial No. 195,634, and in Germany April 28, 1926.

My invention relates to improvements in the method of and machine for working pieces of dough, and the object of the improvements is to provide a method by means of which pieces of dough can be worked into oblong form to produce therefrom oblong rolls, the dough being previously thoroughly worked by circular or oval working operation for reducing the pores produced by fermentation to uniform size. With this object in view my invention consists in first working the pieces of dough in the compartments of the doughing machine by circular or oval movement of the working head, and thereafter completing the working operation within the same compartments by operation within the same compartments by transforming the pieces of worked dough into oblong, oblong-pointed or oval form. When thus working the pieces of dough into oblong form the skin produced on the pieces of dough by the previous circular working operation is put more and more under tension, so that the worked pieces of dough keep the form imparted thereto while allowing fermentation and baking of the same. By imparting different numbers of longitudinal working movements to the pieces of dough the desired form can be imparted to the rolls, the said rolls having, after baking, a slightly oblong circular form, oval form, or elliptical form, and the rolls being provided at the ends with points or having round ends.

In carrying out my improved method I make use of a machine in which the compartments of the working apparatus are in the form of oblong hexagons or the like having parallel sides and placed directly adjacent to each other and one beside the other, or disposed suitable distances apart as is necessary for the following fermentation and baking of the rolls. A working apparatus of this type can be used in working machines of any known or preferred construction, so that by means of any working machine or by means of any dividing or working machine the pieces of dough can be worked into round or oblong form. It is desired to work oblong pieces of dough on a machine originally designed to work round pieces of dough, my improved working head or dividing head is mounted on the said machine without otherwise reconstructing the same.

Other objects of the invention will appear from the following description.

For the purpose of explaining the invention several examples embodying the same have been shown in the accompanying drawings, in which the same letters of reference have been used in all the views to indicate corresponding parts. In said drawings, Fig. 1, is a sectional elevation showing the working head of my improved machine.

Figure 2:
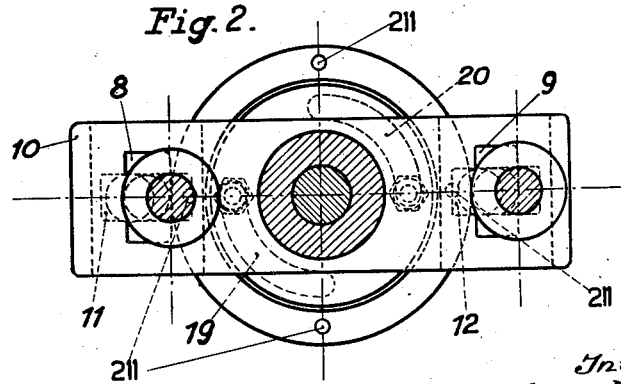
Figure 3:
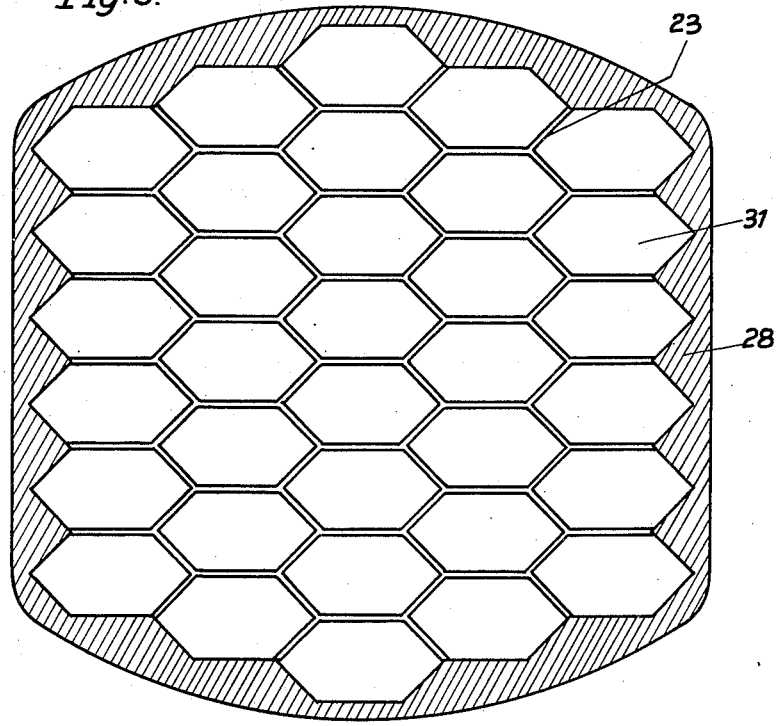
Figure 4:
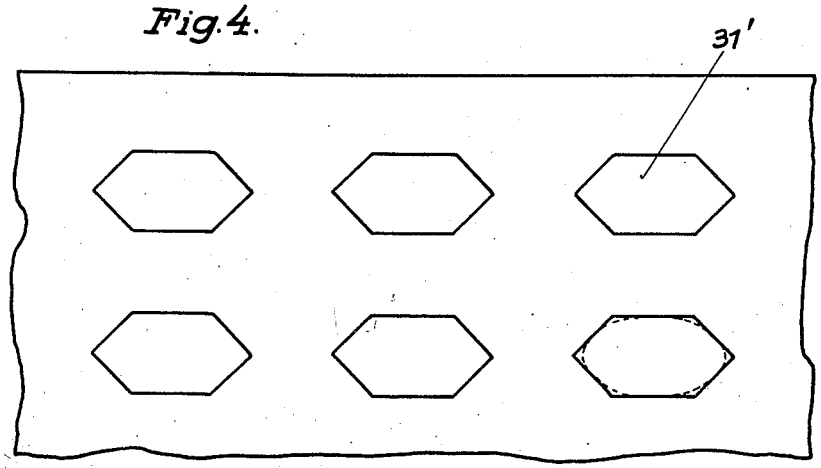
Figure 15:
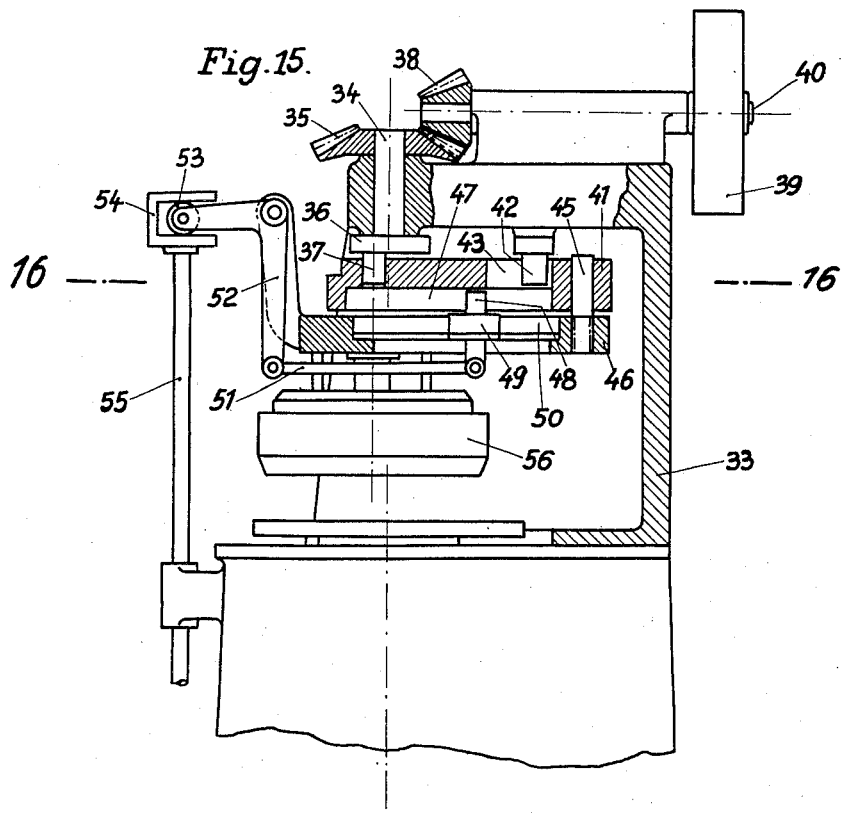
Figure 16:
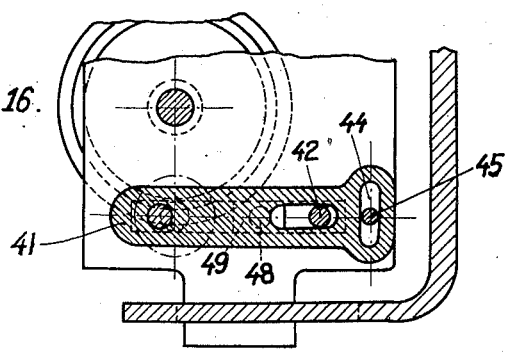
Figure 17:
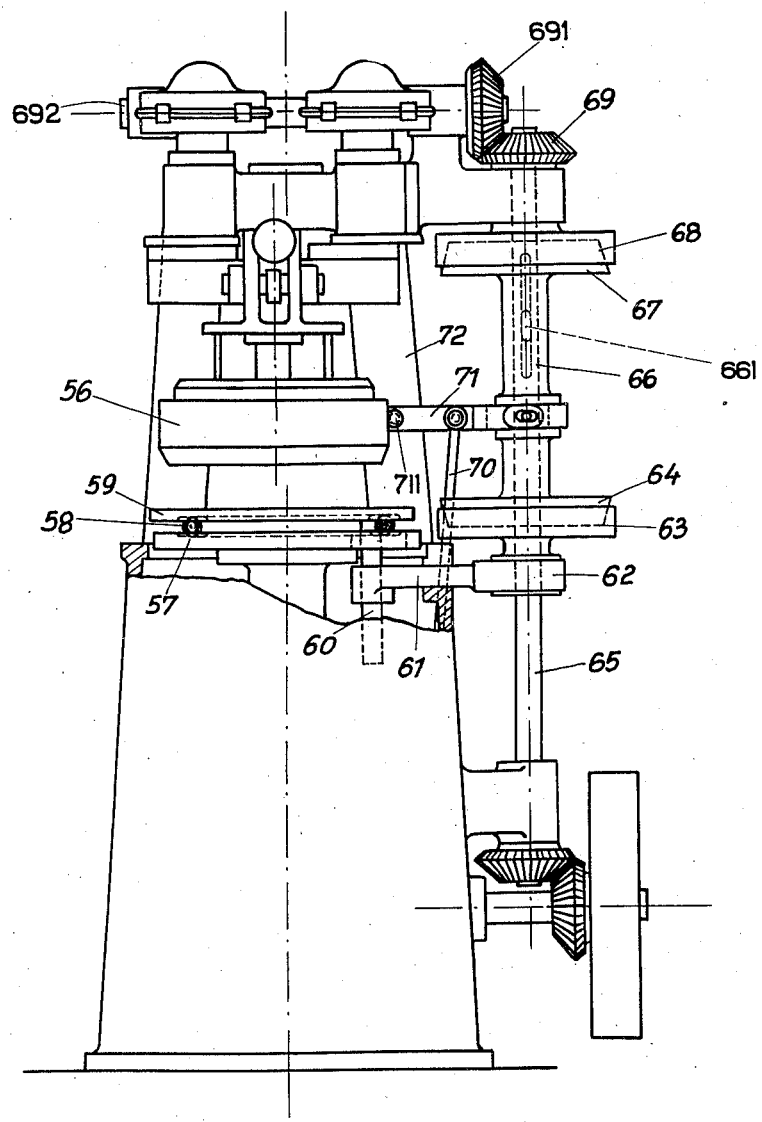
Figure 18:
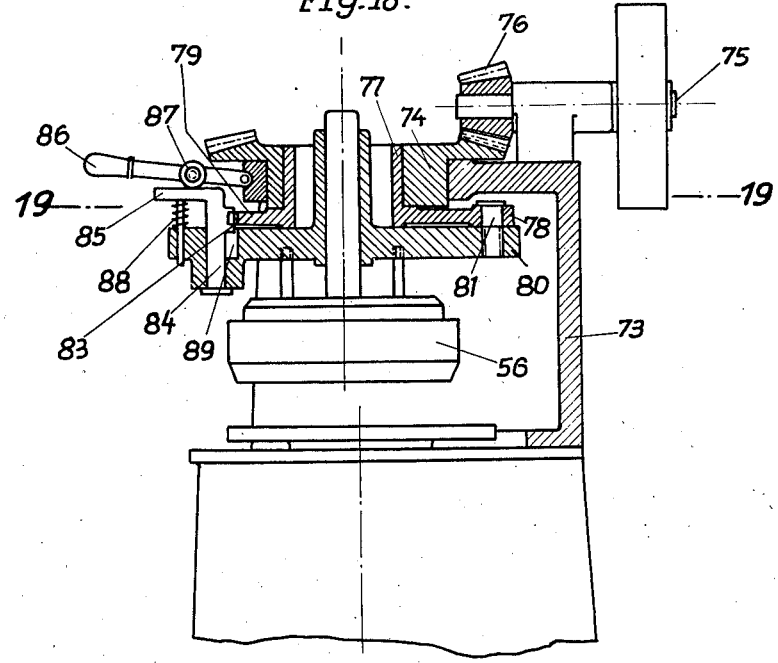
Figure 19:
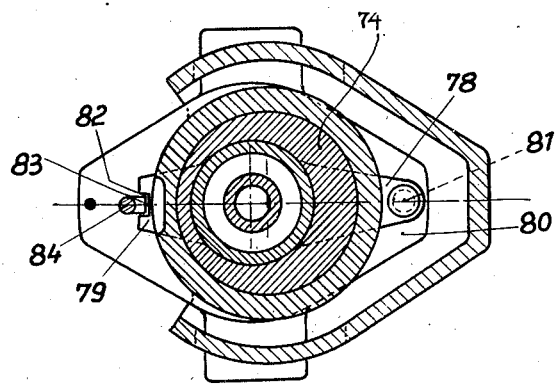
Figure 20:
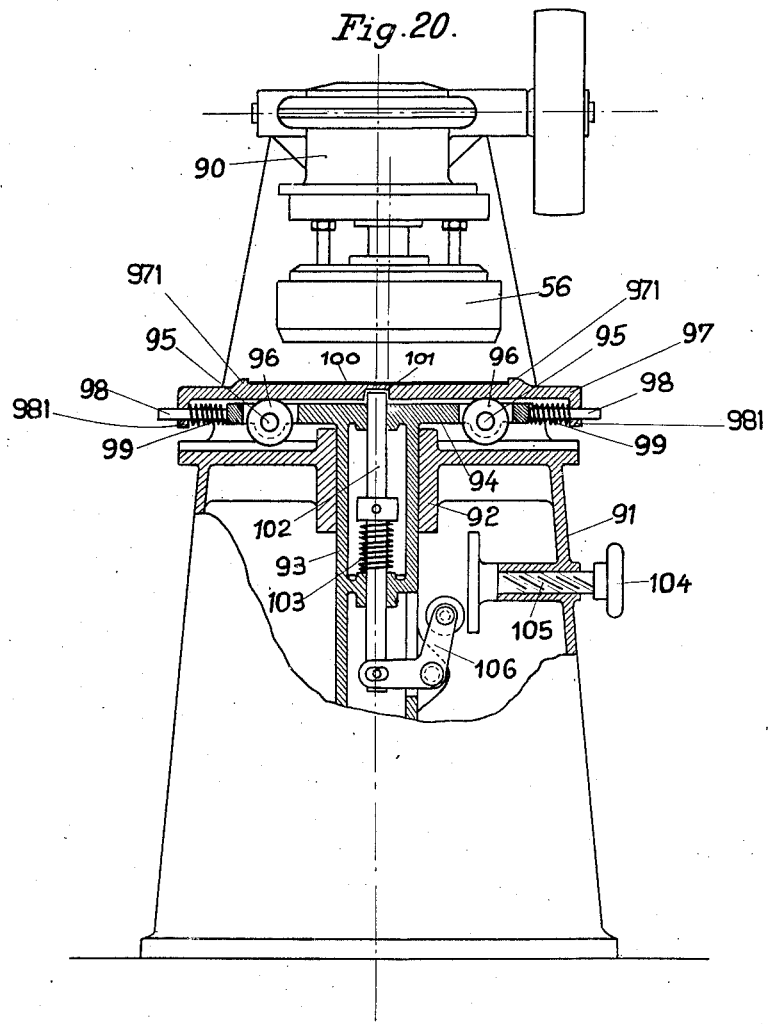
Figure 21:
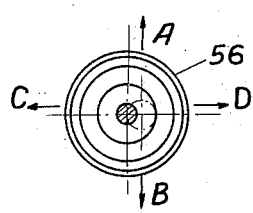
Figure 22:
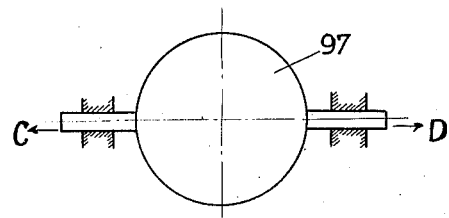
Figure 23:
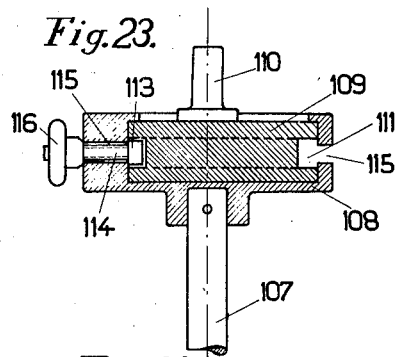
Figure 25:
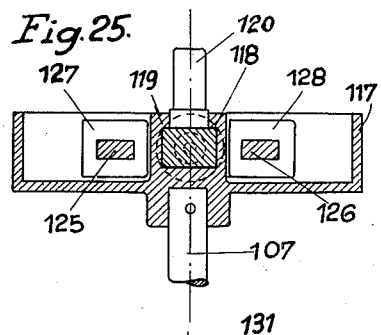
Figure 24:
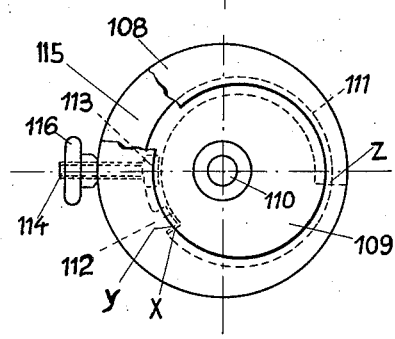
Figure 26:
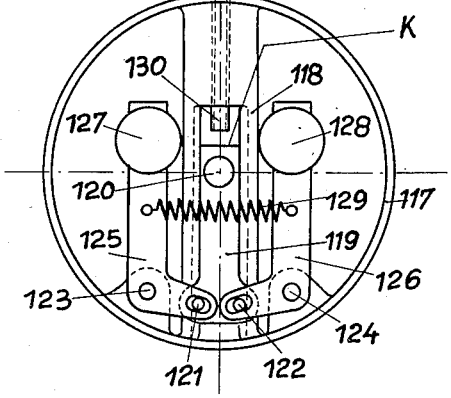
Figure 27:
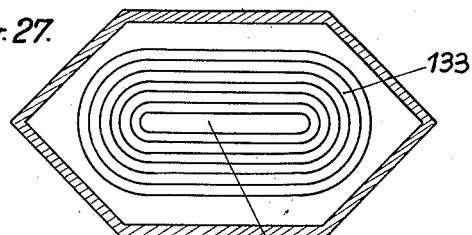
Figure 28:
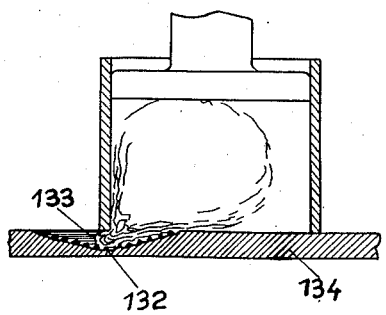
Figure 29:
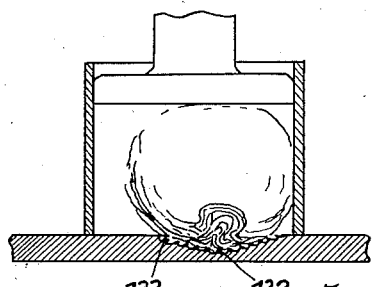

Fig. 2, is a sectional plan view taken on the line 2—2 of Fig. 1,

Fig. 3, is a top plan view showing the dividing apparatus comprising the dividing and working compartments, Fig. 4, is a partial plan view of a working apparatus having the compartments spaced from one another according to the distance between the rolls being baked, Figs. 5 and 6, are diagrammatical plan views showing one of the working compartments, the said compartments being moved in different ways, Fig. 7, is a diagram showing the path of the movement of one of the compartments, Figs. 8 to 14, are diagrammatical plan views showing a compartment and worked pieces of dough brought into different forms by different working operations, Fig. 15, is a sectional elevation of the top part of a working machine illustrating a modification, Fig. 16, is a sectional plan view taken on the line 16—16 of Fig. 15, Fig. 17, is an elevation partly in section showing another modification of the working machine, Fig. 18, is a sectional elevation of the top part of a working machine illustrating another modification, Fig. 19, is a sectional plan view taken on the line 19—19 of Fig. 18, Fig. 20, is an elevation partly in section illustrating another modification, Figs. 21 and 22, are diagrammatical plan views illustrating the methods of operating the machine shown in Fig. 20, Fig. 23, is a detail sectional view of the driving mechanism for the working machines shown in the above figures, Fig. 24, is a top plan view of Fig. 23, Figs. 25 and 26, are respectively a sectional elevation and a top plan view similar to those shown in Figs. 23 and 24 and illustrating a modification of the driving mechanism, Fig. 27, is a diagrammatical plan view showing a working compartment and the portion of the working table carrying the same, and Figs. 28 and 29, are detail sectional elevations illustrating the method of working a piece of dough into oblong form.

The general construction of the dough working machine of which my invention is an improvement has been shown and described in the patent of the United States to Bertram, No. 1,303,454, dated May 13, 1919.

Referring now to the example illustrated in Figs. 1 and 2, the working machine comprises a frame a part 1 of which has been shown in Fig. 1. In vertical bearings of the said frame shafts 2 and 3 are rotatably mounted, each of which carries at its bottom end a crank pin 4 and 5, and the said crank pins are made integral with crank pins 6 and 7 respectively disposed eccentrically of the crank pins 4 and 5, the eccentricity of the pins 6 and 7 relatively to the shafts 2 and 3 being larger than that of the pins 4 and 5 relatively to the said shafts.

The crank pins 4 and 5 are in engagement with slots 8 and 9 formed in a plate 10, and the crank pins 6 and 7 are in engagement with slots 11 and 12 of a plate 13 located below the plate 10, and the plates 10 and 13 are connected with each other by means of a hub 13'. The slots 8 and 9 are disposed perpendicularly of the slots 11 and 12. The downwardly directed part of the disk 13 is formed with a flange 14 carrying at its bottom side a ring 15 connected by means of screws 16 and 17 with a ring 18 located on the flange 14. The screws 16 and 17 are passed through segmental slots 19 and 20 of the flange 14, and they have a certain play relative thereto. Supported from the ring 15 by means of holders 21, 22 are the dividing knife blades 23.

The disk 24 is secured by means of screws 25 and 26 to the bottom end of a vertical shaft 27, and it is rockingly mounted on the said shaft in the same way as the ring 15 is mounted on the flange 14. The construction of the ring 28, the lower presser or dough dividing plate 29, and the table 30 are similar to the construction of parts now in use, and I deem it not necessary to describe the said parts in detail.

After unscrewing the screws 16, 17 and 25, 26, the working head consisting of the parts 23, 24 and 28 can be turned at an angle of 90°. To the disk 13 and the working apparatus suspended therefrom an oval gyratory movement is imparted by means of the crank pins 4, 6 and 5, 7 cooperating with the slots 8, 9 and 11, 12 in a manner readily understood.

In Fig. 3 I have shown the dough dividing member 28. As appears from the said figure, the dough dividing member consists of a plate divided by dividing blades 23 into oblong hexagonal compartments 31. In the example shown in Fig. 3, the said compartments are located close to one another, while in the modification shown in Fig. 4 the compartments 31' are disposed suitable distances apart corresponding to the distance between the worked pieces of dough when fermenting and baking the same. The arrangement of the working compartments 31' shown in Fig. 4 is provided in machines in which the pieces of dough are divided by means of a separate dividing apparatus prior to working them in the compartments 31'. In some cases the corners of the compartments are rounded, as is indicated in dotted lines at the right hand bottom part of Fig. 4, the said modification being advisable particularly where the plate formed with the compartments is not used for dividing the dough, but only for working the same.

When disposing the working apparatus so that the compartments 31 and 31' are disposed with their longitudinal axes in the direction of the larger axis of the oval movement, the pieces of dough are worked into round form though the compartments are oblong in form. By turning the working apparatus at an angle of 90°, and so that the larger axis of the oval movement is disposed transversely of the longitudinal axis of the compartments, the dough is worked into oblong form. In Figs. 5 and 6 I have illustrated both operations. In the said figures the parts 291 and 292 of the lower working plate 29 which in the operation of the machine are not engaged by the bottom edges of the walls of the compartments 31 and 31' are crosshatched. In Fig. 5 the said portion is comparatively long, while in Fig. 6 it is nearly in the form of a regular hexagon. Therefore, when operating in the manner shown in Fig. 6, all the side walls have substantially uniform action on the piece of dough which is therefore brought into approximate spherical form.

The diagram shown in Fig. 7 illustrates the path of the plate 13. The shape imparted to the piece of dough 32 within the compartment 31 depends on the character and the number of the operations of the compartment. Figs. 8 to 14 show different forms of the worked pieces of dough 32. Fig. 8 shows a piece of dough of oblong-rounded form located equal distances away from the side walls of the compartment 31. The piece of dough shown in Fig. 9 has the same general form as that shown in Fig. 8, but it is slightly longer, the number of the operations of the working head tending to elongate the dough being larger than in case of Fig. 8. The said number of operations tending to elongate the piece of dough has been further increased for producing the piece of dough shown in Fig. 10. Fig. 11 shows a piece of dough formed at its ends with points, and Fig. 12 is a top plan view of the said piece of dough ready for baking. Fig. 12 shows that the sharp edges corresponding to the corners of the compartment are always rounded in the worked piece of dough, so that the said piece of dough has never a polygonal form. Fig. 13 shows a piece of dough worked into spherical form. The piece of dough bears on two side walls of the compartment, and the working operation is nearly completed. In this case the working operations are performed in the manner illustrated in Fig. 6. Fig. 14 shows the same piece of dough at the end of the working operation.

Various mechanisms may be provided for imparting oval or elliptical movement. For this purpose the mechanism shown in Figs. 1 and 2 may be used, or either one of the mechanisms described hereafter. In the modification shown in Figs. 15 and 16 the working operations for producing spherical or oblong pieces of dough are performed without first dismounting the working apparatus. In the top part of the machine frame 33 a vertical shaft 34 carrying a bevel gear wheel 35, a crank disk 36 and a crank pin 37 is rotatably mounted. The shaft 34 is driven from a bevel gear wheel 38 meshing with the bevel gear wheel 35 and keyed to a main driving shaft 40 carrying a belt pulley 39. The crank pin 37 engages one end of an arm 41 formed with a longitudinal slot 43 engaged by a pin 42 fixed to the machine frame 33. Thus, when rotating the shaft 34 substantially circular movement is imparted to the left hand end of the arm 41, while its right hand end has substantially a rectilinear reciprocating movement.

The right hand end of the arm 41 is formed with a slot 44 engaged by a pin 45 screwing in a guide plate 46. At its bottom side the arm 41 is formed with a longitudinal slot 47 engaged by a pin 48 carried by a slide 49 and adapted to be shifted relatively to the slot 47 by means of a link 51 connected to a bell crank lever 52 the outer arm of the said bell crank lever carrying a roller or ball 53 straddled by the top end 54 of a controlling rod 55.

By means of the rod 55, the bell crank lever 52, and the link 51 the slide 49 and the pin 48 carried thereby can be shifted within the slot 47 into position with the axis of the pin 48 in alignment with the axis of the shaft 34. If the pin 48 is thus in axial alignment with the shaft 34 the movement of the said shaft 34 is transmitted to the guide plate 46 in one direction by means of the pin 45 and the slot 44, and in the direction perpendicular thereto through the pin 48, the slot 47, the slide 49 and the guide way 50. Thus, the dividing or working head 56, which is suspended in the usual way from the guide plate 46, performs circular working movements. If, however, the pin 48 is shifted by means of the rod 55 to the right and into axial alignment with the pivot bolt 42, the movement of the crank pin 37 is transmitted to the disk 46 in one direction by means of the pin 45 and the slot 44. But in the other direction no movement is transmitted to the disk 46, because the pin 42, which is rigidly fixed to the machine frame 33, is in axial alignment with the pin 48. Therefore the disk 47 and the working head 56 carried thereby have only reciprocating movement, so that they work the pieces of dough into oblong form.

In the modification illustrated in Fig. 17 the circular working operation is performed by a part of the working apparatus, and more particularly by the top part thereof, while the other part is stationary. For working the pieces of dough into oblong form the bottom part of the apparatus is made operative, while the top part is arrested. The top part of the machine by means of which circular working operation is performed is similar in construction to machines heretofore constructed, an example being described in the U. S. patent to Bertram above referred to.

The pressing or dough supporting plate is not fixed to the table 57, but it is supported on a plate 59 having reciprocating movement on the table 57, balls 58 being interposed between the table 57 and the plate 59 to reduce friction. The said balls engage in suitable recesses provided respectively in the top and bottom faces of the parts 57 and 59 as is known in the art. The balls 58 are guided in the said recesses so that the plate 59 can be reciprocated in one direction only, and, as shown, from the right to the left in Fig. 17. To the plate 59 a bolt 60 is fixed which depends downwardly therefrom, and which is engaged by a connecting rod 61 adapted to transmit the movement of a cam 62 to the bolt 60. The said cam 62 is rigidly connected with one member 63 of a friction clutch the member 64 of which is made integral with a sleeve 66 longitudinally shiftable on a vertical shaft 65 and connected therewith by means of a feather 661. At its top end the said sleeve 66 carries the member 67 of a friction clutch the member 68 of which is fixed to a bevel gear wheel 69 meshing with a bevel gear wheel 691 carried by a shaft 692 operatively connected with the upper working mechanism. The sleeve 66 is adapted to be shifted longitudinally of the shaft 65 by means of a link 70 engaging a lever 71 embracing the said sleeve and rockingly mounted on the machine frame 72 at 711.

When shifting the link 70 upwardly the sleeve 66 throws the coupling members 67 and 68 into coupling engagement, so that rotary movement is transmitted from the shaft 65 and the bevel gearing 69, 691 to the shaft 692 and to the upper working mechanism for imparting circular working operation to the head 56, as is known in the art. If, thereafter, the link 70 is pulled downwardly, the coupling members 63 and 64 are thrown into coupling engagement, so that working movement is transmitted from the shaft 65 and through the intermediary of the cam 62 and the connecting rod 61 to the plate 59, so that reciprocating movement is imparted to the said plate. Thus, the previously worked pieces of dough are worked into oblong form.

In the modification shown in Figs. 18 and 19 the apparatus is constructed for successively working the pieces of dough into spherical and into oblong form. In the top part of the machine frame 73 a beveled ring gear 74 is rotatably mounted the hub of which is formed with an eccentric bore, and which is in driving engagement with a bevel gear 76 keyed to the main driving shaft 75. In the said bore a sleeve 77 is rotatably mounted which is made integral at its bottom part with two arms 78 and 79 projecting therefrom in diametrically opposite directions. Below the arms 78 and 79 there is a plate 80 rockingly connected with the arm 78 by means of a bolt 81 screwed in the plate 80. A latch bolt 84 is movably mounted in a bore of the disk 80 positioned opposite to the bolt 81 and has a projection 83 adapted to seat in a notch 82 provided in the arm 79. A spring 88 yieldingly retains the latch bolt in its operative position. At its top the bolt 84 is made integral with a plate 85, and the said plate is in engagement through the intermediary of a ball or roller 87 with a lever 86 pivoted to the frame 73.

In the position of the parts shown in Fig. 18 the projection 83 engages in the notch 82, so that the plate 80 is connected with the sleeve 77 at two diametrically opposite points. Therefore, when the gear wheel 74 is rotated a gyratory movement is imparted to the plate 80 by means of the eccentric sleeve 77, so that the pieces of dough are worked into spherical form. After the pieces of dough have been sufficiently worked, the lever 86 and the bolt 84 are forced downwardly by hand, so that the projection 83 is disengaged from the notch 82 whereupon movement is imparted to the plate 80 only by means of the eccentric sleeve 77 and the arm 78, the said arm 78 acting as a connecting rod for imparting reciprocating movement to the disk 80. The hexagonal compartments in the working head 56 are initially arranged with their larger axis parallel to a line joining bolts 81 and 84.

In Fig. 20 I have shown a modification in which gyratory movement is imparted to the working head 56 by means of a single eccentric driving mechanism the parts of which are located within the casing 90. Mechanism of this type has been shown for example in the aforesaid patent to Bertram. The machine frame 91 is made integral with an axial sleeve 92 providing a bearing for a tubular shaft 93 capable of being moved therein upwardly and downwardly. At its top the said shaft carries a plate 94, and in slots of the said plate bolts 95 are provided on which rollers 96 are rotatably mounted. On the said rollers 96 a table 97 is mounted, which is capable of rectilinear reciprocating movement, and which is guided relatively to the plate 94 by means of bolts 98 projecting from the plate 94 to diametrically opposite directions and passed through eyes 981 depending from the table 97, springs 99 being provided between the plate 94 and the eyes 981 for normally holding the table 97 in median position. At its top the table 97 is formed with small ribs 971 adapted to receive a plate carrying the pieces of dough. Within the tubular shaft 93 a rod 102 is guided, which is acted upon by a spring 103 tending to force the same upwardly and into locking engagement with a recess 101 made in the bottom part of the table 97. The said rod 102 is adapted to be pulled downwardly for releasing the table 97 by means of a bell crank lever 106 acted upon by a bolt 105 screwing in the frame 91 and adapted to be screwed inwardly by means of a hand wheel 104.

The operation of the machine shown in Fig. 20 is as follows: After placing a plate carrying a batch of dough on the table 97, the said batch is first pressed, divided and worked by means of the dividing and working head 56, the said head having gyratory movement so as to impart spherical form to the pieces of dough. After the dough has been sufficiently worked the rod 102 is pulled downwardly by means of the screw 105, whereupon the table 97 is capable of reciprocating movement on the rollers 96, 96. Now the table 97 is carried along by the head 56 moving from the right to the left or vice versa in Fig. 20, the resistance of the pieces of dough located between the head and the table 97 exceeding the resistance opposed to the movement of the table 97 and the springs 99. Thus the working head 56 is reciprocated relatively to the table 97 in a direction perpendicular to the direction of the movement of the table 97 on the rollers 96, and the pieces of dough are worked into oblong form.

The operation of the device shown in Fig. 20 will be better understood from an inspection of the diagrammatical views shown in Figs. 21 and 22. Fig. 21 is a top plan view of the working head 56, and the eccentric has been shown in dotted lines. The circular working movement of the head 56 is composed of two movements of the head performed in two perpendicular directions, the said directions of the reciprocating movements being indicated by the arrows A, B and C, D. Fig. 22 is a diagrammatical plan view of the table 97, which table is capable of reciprocating in the direction of the arrows C and D. If now the locking rod 102 has been retracted from the table 97, the said table is adapted to reciprocate in the direction of the arrows C, D. Thus, the movement of the working head in the direction of the arrows C and D is compensated by the movement of the table 97 in the said direction, so that only the component of the movement in the direction of the arrows A and B is effective, by which working movement in one direction is imparted to the pieces of dough.

I wish it to be understood that my invention is not limited to the mechanism shown herein for retracting the rod 102 from the table 97, and that in some cases automatic means may be provided for this purpose. Further, the movement of the table 97 in one direction by the working head 56 may be supported by springs or the like.

In machines of the type referred to the driving eccentric should be constructed so as to be adjustable, in order that small and large pieces of dough can be worked by means of the same parts. Now, in order to prevent relative angular displacement of the presser plates by eccentric pressure, which angular displacement would cause the dough to be pressed to one side of the presser plates, the eccentric drive is constructed so that when arresting the machine at the end of the working operation the crank pin assumes a position central to the machine. For this purpose the crank pin is mounted on a fly wheel or disk tending to return the same into central position. Thus working operation is transmitted through the said fly wheel or disk and its crank pin after starting the machine, and the eccentricity of the crank pin is varied by means of the fly wheel or disk. The member performing the working operation is automatically set relatively to the stationary member in central position before the pressing operation begins.

In Figs. 23 and 24 I have shown an example in which the driving shaft 107 carries a disk 108 formed with an eccentric circular hole having a circular disk 109 mounted therein. The disk 109 is adapted to be turned within the disk 108 at a certain angle, and in the example shown in the figures at an angle of 180°. The disk 109 carries a crank pin 110 which, in the position shown in Figs. 23 and 24, is in alignment with the shaft 107, and which after turning the disk 109 at an angle of 180° has its largest eccentricity relatively to the shaft 107. The disk 109 is formed circumferentially with a segmental groove 111 the circumferential length of which is a little more than one half the circumference of the disk, and the said groove is engaged by a lug 112 projecting inwardly from the disk 108 and the head 113 of a screw 114 fixed to the said disk 108. The screw 114 is adapted to be set in circumferential direction within a slot 115 made in the disk 108, the length of the said slot in circumferential direction being a little more than 180°, and the screw can be fixed in the desired position by means of a hand wheel 116 screwing thereon.

When the shoulder X of the disk 109 is in engagement with the shoulder Y of the lug 112 the crank pin 110 is in axial alignment with the shaft 107, so that it does not perform gyratory movement when rotating the shaft 107. If however, the disk 108 has been rotated relatively to the disk 109 into position with the head 113 engaging the shoulder Z of the disk 109, the screw 114 being fixed in the position shown in the figures by means of the hand wheel 116, the crank pin 110 is eccentric relatively to the shaft 107, so that it is capable of imparting gyratory movement to the working head. With the screw 114 in the position shown in Fig. 24 the largest working strokes are imparted to the working head. When shifting the screw 114 and its head 113 in circumferential direction towards the shoulder Z of the disk 109 the eccentricity of the crank pin 110 and therefore the size of the working strokes are reduced. Thus the apparatus can be set in any position between the said maximum and minimum for imparting the desired working strokes to the pieces of dough.

When the shaft 107 is at rest the shoulder X bears on the shoulder Y, and when imparting rotary movement to the shaft 107 and to the disk 108 carried thereby, the disk 109 remains at first stationary, until the shoulder Z bears on the head 113 of the disk 114. Thereafter the crank pin 110 connected with the working head performs a gyratory movement, the diameter of the circle depending on the position of the screw 114 within the slot 115 of the disk 108. When arresting the machine the operation is reversed, the disk 108 is first arrested while the disk 109 continues its movement by reason of the inertia of the working head, until the shoulders X and Y are again in engagement with each other. Thereby the working head is again brought into central position.

In the modification shown in Figs. 25 and 26 the crank pin of the driving apparatus is returned into central position by means of members subjected to centrifugal force. The disk 117 keyed to the shaft 107 is formed with a diametrical guide way 118 having a slide 119 shiftable therein, the said slide carrying the crank pin 120 and two bolts 121 and 122. On pivot bolts 123 and 124 fixed to the disk 117 two bell crank levers 125 and 126 are rockingly mounted, the short arms of the said bell crank levers engaging the bolts 121 and 122 carried by the slide 119, and the long arms carrying weighted bodies 127 and 128 and being connected by a spring 129 tending to rock the same inwardly.

When rotating the shaft 107 the weighted bodies 127 and 128 are thrown outwardly by centrifugal action, thus shifting the crank pin 120 out of axial alignment with the shaft 107 and with the end face $k$ into engagement with a screw 130 screwing in the disk 117, the said movement being transmitted from the weighted bodies to the slide 109 by means of the bell crank levers 125 and 126 engaging the bolts 121 and 122. The screw 130 is adapted to be set into the desired position for varying the eccentricity of the crank pin 120 by means of the hand wheel 131.

Otherwise the operation of the apparatus is the same as that of the apparatus described with reference to Figs. 23 and 24.

In Fig. 27 I have shown a top plan view of one of the working portions of the surface of the working table 134, the walls of the working compartment being shown in section. The said working portion is formed with a longitudinal recess or slot 132 and stepped ridges 133 surrounding the said recess or slot. The configuration of the working surface is particularly designed for working the dough into oblong form, but when properly moving the working head the pieces of dough may also be worked into spherical form. If desired the slot or recess 132 may be bridged at one or more points.

Figs. 28 and 29 show the working compartment in different positions relatively to the working portion of the working table. As shown in Fig. 28 the working compartment is in its outermost position relatively to the working portion 132, 133. As appears from the said figure, the recess and the ridges of the working portion tend to hold the pieces of dough when imparting working movement thereto transversely of the recess 132, so that the skin of the piece of dough is put under tension.

Fig. 29 shows the compartment in the position after performing about ⅓ of the movement of the driving eccentric. The figure shows how the skin is contracted at the bottom part of the piece of dough, and that the dough is overthrown in the manner of waves, whereupon it is again compressed at its bottom part when the right hand wall of the compartment which in the position shown in the figure makes contact with the dough is further moved to the left. These operations are repeated during each working stroke transversely of the recess 132, so that by each working stroke a part of the skin is folded into the piece of dough at the bottom part thereof, and the skin is put more and more under tension at the longitudinal sides of the piece. The said action is always performed on the long sides of the piece of dough being elongated, whereby the worked piece of dough loses more and more its tendency to assume its spherical form.

The recess 132 may be in the form of an elongated depression of the table 134, as is shown in Figs. 28 and 29, or it may be in the form of a slot passed all through the thickness of the table.

The gyratory movements for forming the pieces of dough into spherical and oblong form may also be performed by the table, or they may be performed in part by the table and in part by the working head.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A machine for working dough, comprising a working table, a working head having elongated working compartments, means to impart relative gyratory movement to the said working head and compartments, and means to increase the working movement transversely of the length of the compartments relatively to the movement longitudinally thereof.

2. A machine for working dough, comprising a working table, a working head having elongated hexagonal working compartments, means to impart relative gyratory movement to the said working head and compartments, and means to increase the working movement transversely of the length of the compartments relatively to the movement longitudinally thereof.

3. A machine for working dough, comprising a working table, a working head having elongated hexagonal working compartments disposed in close proximity to each other and cutting blades separating said compartments from each other, means to impart relative gyratory movement to the said working head and compartments, and means to increase the working movement transversely of the length of the compartments relatively to the movement longitudinally thereof.

4. A machine for working dough, comprising a working table, a working head having elongated working compartments, and means to impart relative oblong gyratory movement to the said working head and compartments, the position of said imparting means relatively to the member driven thereby being adapted to be changed in angular direction.

5. A machine for working dough, comprising a working table, a working head having elongated working compartments, and means to impart relative gyratory movement to the said working head and compartments, said means comprising a rotary member, a sleeve rotatably and eccentrically mounted in said rotary member, flanges on said sleeve, a bolt in one of said flanges, a plate pivoted on said bolt below said flange, a working head secured to said plate, the other of said flanges having a notch therein, and a catch on said plate adapted to engage releasably in said notch.

6. A machine for working dough, comprising a working table, a working head having elongated working compartments, means to impart relative gyratory movement to the said working head and compartments, and means to increase the working movement transversely of the length of the compartments relatively to the movement longitudinally thereof, said table being formed at the portions corresponding to said compartments with elongated recesses disposed longitudinally of said compartments, the bottom of said recesses being closed.

7. A machine for working dough, comprising a working table, a working head having elongated working compartments, means to impart relative gyratory movement to the said working head and compartments, and means to increase the working movement transversely of the length of the compartments relatively to the movement longitudinally thereof, said table being formed at the portions corresponding to said compartments with elongated recesses and concentric ridges disposed longitudinally of said compartments, the bottom of said recesses being closed.

8. A machine for working dough, comprising a table, a working head cooperating with said table and having elongated compartments therein, and means to impart gyratory movement to said head, said means comprising a rotary member, an eccentric member mounted therein, and a plate fixed to said head and connected to said eccentric member at two points, the connection at one of said points being releasable to allow the plate to be driven by means of the connection at the other point.

9. A machine for working dough, comprising a working head, and means to actuate said head comprising an eccentric member, means for imparting gyratory movement to said eccentric member, a pivotal connection between said eccentric member and said head, and a releasable latch member for fixedly connecting said eccentric member to said head.

10. A machine for working dough, comprising a table having roughened surfaces, a working head cooperating with said table and having elongated compartments therein, and means to actuate said head comprising an eccentric member, means for imparting gyratory movement to said eccentric member, a pivotal connection between said eccentric member and said head, and a releasable latch member for fixedly connecting said eccentric member to said head.

OTTO KREMMLING.